| United States Patent [19] | [11] | 4,060,683 |
|---|---|---|
| Tessler | [45] | Nov. 29, 1977 |

[54] PREPARATION OF CATIONIC STARCHES AND CATHIONIC STARCHES THUS PRODUCED

[75] Inventor: Martin M. Tessler, Edison, N.J.

[73] Assignee: National Starch and Chemical Corporation, Bridgewater, N.J.

[21] Appl. No.: 719,266

[22] Filed: Aug. 31, 1976

[51] Int. Cl.$^2$ ............................................. C08B 31/08
[52] U.S. Cl. .................... 536/50; 260/293.86; 260/558 P; 260/561 A
[58] Field of Search .......................................... 536/50

[56] References Cited

U.S. PATENT DOCUMENTS 3,033,852  5/1962  Paschall .................................. 536/50

*Primary Examiner*—Melvyn I. Marquis
*Attorney, Agent, or Firm*—Edwin Szala; Ellen T. Dec

[57] ABSTRACT

A reagent for the modification of starch is prepared from the reaction of a 2,3-dihalopropionamide with a secondary amine. When starch is treated with this modifying reagent, a novel cationic starch characterized by the presence of a carboxamide group bound directly to a cationic amine substituent is produced.

8 Claims, No Drawings

PREPARATION OF CATIONIC STARCHES AND CATHIONIC STARCHES THUS PRODUCED

BACKGROUND OF THE INVENTION

I. Field of the Invention

This invention relates to a novel reagent and method for the preparation of cationic starches and to the cationic starches thus produced. More particularly, the invention relates to cationic starch derivatives formed by treating starch with the reaction product of a 2,3-dihalopropionamide with a secondary amine.

II. Brief Description of the Prior Art

The modification of starch by chemical derivatization to produce various cationic starches is well known. Cationic starches, i.e. starches which have been modified so that they have a positive electrostatic charge, are used for a large number of applications and are particularly useful in the manufacture of paper due to their greater retention on the paper web as compared to unmodified starches.

A similar starch modification reagent prepared from the reaction of a 2,3-dihalopropionic acid or alkyl ester thereof with a secondary amine has been disclosed in my co-pending application Ser. No. 639,490 filed Dec. 10, 1975 now U.S. Pat. No. 4,017,460. The starch derivatives disclosed therein differ from those of the present invention in that the former are zwitterions and are characterized by the presence of both a cationic and an anionic substituent group on the same reaction site while the starch derivatives of the present invention differ in structure possessing only a cationic substituent as is evidenced by the fact that they are cationic up to about pH 8.2.

SUMMARY OF THE INVENTION

In accordance with the present invention, a novel reagent useful for the chemical modification of starch is prepared by the reaction of a 2,3-dihalopropionamide with a secondary amine. The reaction of the resulting reagent with starch, carried out in an aqueous solution under controlled conditions, produces novel cationic derivatives which are characterized by the presence of a carboxamide group bound directly to the cationic amine substituent.

The thus produced modified starch derivatives are characterized by their greater stability, their ability to form cooked pastes which are more resistant to gelling upon cooling, and their lowered gelatinization temperatures, as compared to the corresponding untreated starches. These properties permit the derivatives of the invention to be utilized in a number of applications including uses in various sizings, coatings, thickeners, adhesives, etc. In addition to the known benefits obtained due to the presence of the cationic functionality, the presence of the reactive amide group on the modified starch may also be useful as, for example, for cross-linking with aldehydes in the production of water-insoluble coatings or films.

DESCRIPTION OF THE PREFERRED EMBODIMENTS

The applicable starch base materials which may be used in preparing the starch ether products of the present invention may be derived from any plant source including corn, potato, sweet potato, wheat, rice, sago, tapioca, waxy maize, sorghum, high amylose corn, etc. Also included are the conversion products derived from any of the latter bases including, for example, dextrines prepared by the hydrolytic action of acid and/or heat; oxidized starches prepared by treatment with oxidants such as sodium hypochlorite; derivatized starch such as starch ethers and esters; and fluidity or thin boiling starches prepared by enzyme conversion or by mild acid hydrolysis. The use of the term "starch base" is thus seen to include any amylaceous substance, whether untreated or chemically modified which, however, still retains free hydroxyl groups capable of entering into the reaction of this invention. If the desired product is to be a granular starch then obviously the initial starting material must be in granular form. It is to be noted that the method of the invention may also be carried out employing gelatinized starches which will result in the production of non-granular starch ethers.

The modifying agents used in the practice of the present invention are the reaction products of a 2,3-dihalopropionamide with a secondary amine under controlled reaction conditions. The 2,3-dihalopropionamide may be represented by the formula:

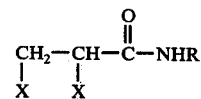

where X is bromine or chlorine and R is hydrogen or $C_1$-$C_8$ alkyl. Thus, for purposes of the invention the expression "dihalo" will be meant to include the dichloro and dibromopropionamide species. Suitable compounds include 2,3-dibromopropionamide, 2,3-dichloropropionamide, 2-bromo-3-chloropropionamide, N-isopropyl-2,3-dibromopropionamide, etc. The secondary amines used to produce the novel modifying agents correspond to the formula:

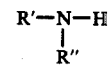

where R' and R" are, independently, alkyl, alkenyl, arylalkyl, or ether substituted alkyl or alkenyl wherein the total number of carbon atoms in R' and R" combined is a maximum of 12. Suitable secondary amines include diethylamine, diallylamine, di-n-propylamine, di-isopropylamine, di-t-butylamine, methyl allylamine, 2-(ethylamino)ethyl ethyl ether, di-n-hexylamine, benzylamine, etc. Also included are cyclic amines, e.g. piperidine, wherein R' and R" are connected together.

The exact structure of the reaction product, i.e. modifying agent, is not known with certainty; the reaction product probably being a complex mixture of compounds. Four probable compounds which compose the majority of the reaction products in the mixture are as follows:

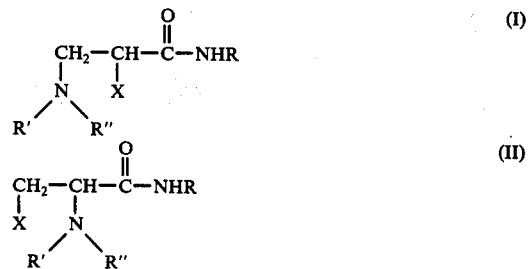

-continued $$\begin{array}{c} \text{O} \\ \parallel \\ \text{CH}=\text{CH}-\text{C}-\text{NHR} \\ | \\ \text{N} \\ \diagup \quad \diagdown \\ \text{R}' \quad \text{R}'' \end{array} \quad \text{(III)}$$

$$\begin{array}{c} \text{O} \\ \parallel \\ \text{CH}_2=\text{C}-\text{C}-\text{NHR} \\ | \\ \text{N} \\ \diagup \quad \diagdown \\ \text{R}' \quad \text{R}'' \end{array} \quad \text{(IV)}$$

wherein X, R, R', and R'' are as previously defined.

The preparation of the modifying reagents of the invention is carried out by reacting approximately equimolar amounts of the 2,3-dihalopropionamide with the secondary amine. Since one or two moles of acid are evolved during the reaction, depending on whether structures I and II or III and IV are formed, it will normally be necessary to neutralize the evolved acid, preferably with inorganic bases, e.g. sodium carbonate. The reaction is ordinarily carried out in an organic medium such as benzene, toluene or 1,2-dichloroethane at a temperature of about 20° to 100° C. for a period of 10 minutes to 18 hours. Higher temperature will require shorter reaction times. The reaction mixture is then cooled and the insoluble inorganic salts removed by filtration. The solvent is removed from the filtrate by distillation to yield a crude product. This crude product can be used directly to form the cationic starch ether derivatives of the invention. The crude product can be purified by dissolving in an aqueous acid, extracting with a water-insoluble organic solvent, such as benzene, to remove unreacted amide and then using the resulting purified aqueous solution to produce a modified starch. If the product is purified and used in aqueous solution, solids contents in the range of 20 to 40% by weight are generally employed. Alternatively, the modifying reagent may be prepared in situ during reaction with the starch base as will be discussed hereinbelow.

It will be recognized by one skilled in the art that, to the extent that the modifying agent may exist as a mixture of compounds, the exact structure of the modified starches is not known with certainty. It is, however, reasonable to assume that stabilization is afforded by the presence of the reagent groups bound to the starch by covalent bonds. The characteristic structure of the modified portions of the stable starch derivative will therefore depend on the actual structure of the reagent, the mechanism by which the modifier reacts with the starch and the stability of the reagent and the initial starch product under the alkaline reaction conditions. For example, the modified portion of the starch may be typically represented by any one of the following general structures, (i), or (ii), or a combination of more than one of the structures.

$$\begin{array}{c} \text{O} \quad \text{H} \\ \parallel \quad \diagup \\ \text{St}-\text{O}-\text{CH}_2-\text{CH}-\text{C}-\text{N} \\ | \quad \diagdown \\ \text{N} \quad \text{R} \\ \diagup \quad \diagdown \\ \text{R}' \quad \text{R}'' \end{array} \quad \text{(i)}$$

$$\begin{array}{c} \text{O} \quad \text{H} \\ \parallel \quad \diagup \\ \text{St}-\text{O}-\text{CH}-\text{CH}_2-\text{C}-\text{N} \\ | \quad \diagdown \\ \text{N} \quad \text{R} \\ \diagup \quad \diagdown \\ \text{R}' \quad \text{R}'' \end{array} \quad \text{(ii)}$$

wherein St—O—represents the starch molecule in which a hydrogen of a hydroxyl group of an anhydroglucose unit has been replaced by a substituent group derived from the modifying agent; and R, R' and R'' are as previously defined.

It will be recognized by those skilled in the art that during the alkaline starch reaction conditions, some of the amide linkages, especially the unsubstituted amide linkages, may hydrolyze to carboxyl groups. However, zeta potential measurements indicate the starch products are cationic below about pH 8.2, indicating some of structure (i) or (ii) are present.

The practitioner will recognize that the starch molecule is a polymer which contains many anhydroglucose units, each having three free hydroxyl groups (except the non-reducing end glucose units which contain four free hydroxyl groups) which may react with the modifying agent. Thus, the number of such displacements or the degree of substitution (D.S.) will vary with the particular starch, the ratio of the modifying agent to the starch and, to some extent, the reaction conditions. Furthermore, since it is known that the relative reactivity of each of the hydroxyl groups within the anhydroglucose unit is not equivalent, it is probable that some will be more reactive with the modifying agent than others.

The novel method of this invention comprises reacting a selected reagent, as described hereinabove, with a starch base which is suspended or dispersed in water. The reaction of the modifying agent with the starch base is carried out at temperatures ranging from about 10° to 60° C., preferably, 20° to 50° C.

The pH of the reaction mixture is ordinarily controlled so as to be above 10.0 but below 12.5, with the preferred range being about 11.4 to 12.0. The pH is conveniently controlled by a periodic addition of a dilute aqueous solution of sodium hydroxide or other common base including potassium hydroxide, sodium carbonate, calcium hydroxide, tetramethylammonium hydroxide, etc. Alternately, the pH is not controlled but an excess of the base is added initially to maintain the required alkaline pH. Under certain conditions, it may also be desirable to add sodium sulfate to suppress swelling of the starch and to give a more filterable starch product.

The amount of modifying agent used to react with the starch base will vary from about 1 to 100%, preferably from 7 to 20%, based on the dry weight of the starch and dependent on such factors as the starch base employed, the degree of stabilization required in the end product and the particular modifying agent used.

Reaction time will vary from about 0.2 to 16 hours, preferably 1 to 3 hours, depending on such factors as the eactivity of the reagent, the amount of reagent, the temperature and pH employed, etc. After completion of the reaction, the pH of the reaction mixture is preferably adjusted to 3.0 to 7.0 with any common acid such as hydrochloric, sulfuric, acetic, etc. The resultant modified starch, if in granular form, is then recovered by filtration, washed free of residual salts with water, and dried. Alternatively, the washed product may be drum dried, or spray dried, or gelantinized and isolated by alcohol precipitation or freeze drying. If the starch product is non-granular, it can be purified by dialysis to remove residual salts and isolated by alcohol precipitation or by freeze drying.

In accordance with an alternate embodiment wherein the modifying reagent is generated in situ during reaction with the starch, the separate components are added to an aqueous alkaline suspension of the starch and the mixture allowed to react in the manner described hereinabove at 10° to 60° C. for 0.2 to 16 hours and isolated after adjusting the pH with acid. The order of addition of the separate components is not critical, however, it is preferred that the amine be added before the dihalopropionamide to minimize the amount of cross-linking in the resulting starch product.

The degree of stabilization of the novel starch derivatives depends on the reaction conditions employed and the amount of the particular modifying agent used. Despite the presence of trace amounts of crosslinking, the starch derivatives of the invention are characterized by their ability to yield thick, high viscosity dispersions which are cohesive and stable. The nitrogen content of any particular starch derivative may be determined by comparing the amount of nitrogen contained in the derivative with that of the non-reacted starch base, as determined by the Kjeldahl method.

It is thus seen that the novel method of this invention enables the practitioner to effectively prepare cationic starch ethers which can be utilized in many industrial applications such as those employing suspending agents, thickeners, sizings, adhesives, etc.

The follwing examples further illustrate the preferred embodiments of the invention although it will be appreciated that a large number of variations may be effected in reacting the starch base with the modifying agents in accordance with the reaction procedure described above without materially departing from the spirit and scope of the invention. In the examples, the parts are by weight, unless otherwise specified.

EXAMPLE I

This example illustrates the preparation of the novel cationic starch ethers of this invention.

In preparing these derivatives designated 1-15 in Table I, the basic procedure which was followed comprised the suspension of 60 parts of the indicated starch base in 75–90 parts water. Then the indicted amounts of 2,3-dibromopropionamide, the specific amine, and calcium hydroxide were added and the reaction proceeded under agitation at the desired temperature for the required time. The resulting starch ether derivatives were then acidified with dilute hydrochloric acid to a pH of 3.0, recovered by filtration, washed with water, and dried.

The following Table I lists the pertinent data relating to the various starch derivatives which were prepared. The nitrogen content of each starch derivative was measured by the Kjeldahl method.

Derivative 4 was further characterized by measuring its zeta potential at different pH's. The data indicates that derivative 4 becomes cationic below pH 8.2, indicating that tertiary amines are present in the starch which becomes protonated as the pH decreases below 8.2 giving the starch a positive charge.

EXAMPLE II

This example illustrates the effect of pH on the preparation of the cationic ethers of this invention.

Starch A

A total of 50 parts corn starch was added to 67.5 parts water and the pH adjusted to 10.0 with 3.0% aqueous sodium hydroxide. Then 1.3 parts diethylamine nd 3.8 parts 2,3-dibromopropionamide were added and the mixture agitated at room temperature for 19 hours while controlling the pH at 10.0 by periodically adding 3.0% aqueous sodium hydroxide when required. After 19 hours, the pH was lowered to 5.0, the starch recovered by filtration, washed with water, and dried. Starch A was found to contain 0.11% nitrogen, by weight.

TABLE I

| Derivative # | Base Starch | Weight % on Starch Dibromo-propionamide | Ca(OH)$_2$ | Amine | Amine | Temp. °C | Time hours | % Nitrogen |
| --- | --- | --- | --- | --- | --- | --- | --- | --- |
| 1 | corn | 7.6 | 2.4 | 3.4 | diallylamine | RT* | 2 | 0.23 |
| 2 | corn | 1.5 | 0.5 | 0.7 | diallylamine | RT | 2 | 0.14 |
| 3 | corn | 7.7 | 3.0 | 2.4 | diethylamine | 40 | 17 | 0.38 |
| 4 | corn | 7.7 | 3.0 | 2.4 | diethylamine | RT | 17 | 0.47 |
| 5 | acid converted waxy maize (85 fluidity) | 3.8 | 3.0 | 1.2 | diethylamine | RT | 1 | 0.27 |
| 6 | waxy maize | 7.6 | 3.0 | 2.5 | diethylamine | RT | 2 | 0.43 |
| 7 | high amylose corn starch (55% amylose, by weight) | 7.6 | 3.0 | 2.5 | diethylamine | RT | 2 | 0.21 |
| 8 | corn | 7.7 | 3.0 | 2.8 | piperidine | RT | 17 | 0.26 |
| 9 | corn | 7.7 | 3.0 | 6.2 | di-n-hexylamine | RT | 17 | 0.22 |
| 10 | corn | 7.7 | 3.0 | 4.0 | benzylmethyl-amine | RT | 17 | 0.26 |
| 11 | corn | 7.6 | 3.0 | 2.6 | diethylamine | 50 | 2 | 0.35 |
| 12 | corn | 7.6 | 3.0 | 2.6 | diethylamine | 10 | 6 | 0.49 |
| 13 | tapioca | 7.6 | 3.0 | 2.6 | diethylamine | RT | 2 | 0.30 |
| 14 | waxy maize previously treated with 7.0% propyleneoxide and 0.023% phosphorous oxychloride | 7.6 | 3.0 | 2.6 | diethylamine | RT | 2 | 0.36 |
| 15 | corn starch previously oxidized with hypochlorite to 75 fluidity | 7.6 | 3.0 | 2.6 | diethylamine | RT | 2 | 0.38 |

*RT represents room temperature

Starch B

Starch B was prepared in the identical manner as Starch A except the pH was controlled at 11.0. Starch B was found to contain 0.19% nitrogen, by weight.

Starch C

Starch C was prepared in the identical manner as Starch A except the pH was controlled at 11.4. Starch C was found to contain 0.30% nitrogen, by weight.

EXAMPLE III

This example illustrates the preparation of cationic starch ethers using a gelatinized starch base.

A total of 20.0 parts waxy maize which had been acid converted to a degree known in the trade as 85 fluidity was added to 40.0 parts water and the suspension cooked in a boiling water bath for 15 minutes. The dispersion was cooled to room temperature, the pH raised to 11.9 with 50% aqueous sodium hydroxide and then 5.2 parts diethylamine and 14.2 parts 2,3-dibromopropionamide were added. The reaction mixture was stirred for five hours at room temperature while controlling the pH between 11.8–12.0 by adding 20% aqueous sodium hydroxide as required. The pH was then lowered to 5.0 with 10% aqueous hydrochloric acid. The starch product was purified by dialysis and isolated by freeze drying. Analysis of the purified product indicated it contained 2.2% nitrogen, by weight.

EXAMPLE IV

This example illustrates the preparation of N-alkyl substituted dibromopropionamides and their use in preparing the novel cationic ethers of this invention.

In three separate experiments, 12.7, 11.3, and 18.3 parts N-t-butyl acrylamide, N-isopropylacrylamide, and N-isooctylacrylamide were added to 95 parts benzene or carbon tetrachloride. Then 16.0 parts bromine was added dropwise at room temperature with agitation. The temperature increased during the reaction to about 30°–40° C. and after 1 hour, the products were isolated by filtration, washed with solvent and dried. Analysis by NMR indicated bromination was quantitative and no double bonds could be detected.

A total of 25 parts corn starch was added to a solution of 0.75 parts sodium hydroxide and 7.5 parts sodium sulfate in 32.5 parts water. Then 0.37 parts diethylamine and 1.44 parts N-t-butyl-2,3-dibromopropionamide were added and the mixture was agitated at 40° C. for 17 hours. The pH was lowered to 5.0 with 10% aqueous hydrochloric acid, the starch product recovered by filtration, washed with ethyl alcohol and water, and dried. The starch product contained 0.35% nitrogen, by weight.

The above reaction was repeated two times in an identical manner except that the N-isobutyl-2,3-dibromopropionamide was replaced with 1.37 parts N-isopropyl-2,3-dibromopropionamide or 1.72 parts N-isooctyl dibromopropionamide. The starch products were found to contain 0.35 and 0.17% nitrogen respectively.

EXAMPLE V

This example illustrates the preparation of 2,3-dibromopropionamide/diethylamine condensates in organic solvents and the usefulness of said reagents in preparing the starch derivatives of this invention.

Condensate I

A total of 5.6 parts sodium carbonate and 11.6 parts 2,3-dibromopropionamide were added to 90 parts benzene. Then 3.8 parts diethylamine was slowly added. The reaction was exothermic and the mixture was agitated at 40° C. for 4 hours, cooled, and filtered. The benzene was removed from the filtrate by distillation in a rotary evaporator to yield 4.2 parts condensate I. Condensate I (2.0 parts) was added to 40.0 parts benzene and extracted with 40 parts water which was previously acidified to pH 1.5 with hydrochloric acid. Then 25 parts corn starch and 0.75 parts calcium hydroxide were added to the water extract and the mixture agitated at room temperture for 2 hours. The pH was lowered from 11.1 to 3.0, the starch recovered by filtration, washed by resuspension three times in water, and dried. The resulting starch product was found to contain 0.22% nitrogen, by weight.

Condensate II

Condensate II was prepared in the identical manner as condensate I except benzene was replaced with 1,2-dichloroethane. The yield of crude condensate II was 7.0 parts. The condensate was purified and reacted with corn starch in the identical manner as condensate I. The resulting starch derivative contained 0.46% nitrogen, by weight.

EXAMPLE VI

This example illustrates the preparation of the 2,3-dibromopropionamide/diethylamine condensate in water prior to the starch reaction.

A total of 1.52 parts 2,3-dibromopropionamide and 0.52 parts diethylamine were agitated in 38.0 parts water for 7.5 hours at room temperature. Then 30.0 parts corn starch and 0.9 parts calcium hydroxide were added and the mixture agitated at room temperature for 18 hours. The pH was then lowered to 3.0 with 9.5% aqueous hydrochloric acid, the starch recovered by filtration, washed with water, and dried. Upon analysis, the starch product was found to contain 0.27% nitrogen, by weight.

EXAMPLE VII

This example illustrates the preparation and use of the modified starch according to this invention.

A total of 150 parts corn starch was suspended in 187 parts water and the pH was lowered to 0.5 with 9.5% aqueous hydrochloric acid. The starch slurry was then agitated at 52° C. for 1.5 hours, cooled to room temperature and the pH raised to 6.0 with calcium hydroxide. Then 3.65 parts diethylamine, 11.5 parts 2,3-dibromopropionamide and 4.5 parts calcium hydroxide were added. The resulting mixture was agitated at room temperature for one hour, the pH lowered to 3.0 with 9.5% aqueous hydrochloric acid, the starch product recovered by filtration washed with water and dried. The starch product contained 0.44% nitrogen, by weight, and zeta potential measurements indicated it was cationic below pH of about 8.0.

The cationic product prepared as described above is useful in the manufacture of paper. The described starch product was added to a bleached sulfite pulp in such an amount so as to provide, 0.25% by weight, solids derived from the starch product based on the quantity of pulp solids. The pulp also contained 10% by weight, of titanium dioxide pigment. The pulp was made into sheets of paper by hand. The resulting hand made sheets were ashed, and the pigment residue weighed to determine what percentage of the pigment had been retained on the paper. The pigment retention percentages for the product of this example compared to those of a blank containing no pigment retention aid are summarized in Table II.

TABLE II

|  | % Pigment Retention at pH | |
| --- | --- | --- |
|  | 7.6 | 6.0 |
| Product of Example VII | 40 | 53 |
| Blank | 19 | 47 |

I claim:

1. A method for the preparation of modified starch products comprising the steps of
   1. reacting a starch base with a modifying agent in an aqueous medium at a pH of 10.0 to 12.5 and a temperature of 10° to 60° C. for a period of 0.2 to 16 hours, said modifying agent comprising the reaction product of
      a. a 2,3-dihalopropionamide of the formula:

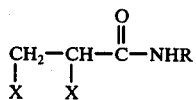

wherein X is a bromine or chlorine and R is hydrogen or $C_1$–$C_8$ alkyl with
      b. a secondary amine of the formula

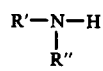

where R' and R" are, independently, alkyl, alkenyl, arylalkyl or ether substituted alkyl or alkenyl or wherein R' and R" are connected to form a cyclic amine and wherein the total number of carbon atoms in R' and R" combined is a maximum of 12, wherein the reaction to form said modifying agent is carried out at a temperature of 20° to 100° C, in an organic medium for a period of 10 minutes to 18 hours; and
   2. isolating the resulting starch product.

2. The method of claim 1 wherein the modifying agent is present in an amount of about 1 to 100% by weight of the starch base.

3. The method of claim 1 wherein the modifying agent is prepared in situ in the reaction medium immediately prior to its reaction with the starch base.

4. The method of claim 1 wherein the starch base is in granular form.

5. The method of claim 1 wherein the starch base is in non-granular form.

6. The method of claim 1 wherein the 2,3-dihalopropionamide is selected from the group consisting of 2,3-dibromopropionamide, 2,3-dichloropropionamide, N-isopropyl-2,3-dibromopropionamide, N-t-butyl-2,3-dibromopropionamide, and N-isooctyl-2,3-dibromopropionamide.

7. The method of claim 1 wherein the secondary amine is selected from the group consisting of diethylamine, diallylamine, di-n-propylamine, di-iso-propylamine, di-t-butylamine, methyl allyl amine, 2-(ethylamine)ethyl ethyl ether, di-n-hexylamine, benzylamine and piperidine.

8. As a composition of matter, the starch derivative formed by the method of claim 1.

* * * * *